(12) United States Patent
Myers

(10) Patent No.: US 8,915,026 B2
(45) Date of Patent: Dec. 23, 2014

(54) WILDLIFE BARRIER APPARATUS AND SYSTEM

(71) Applicant: Kristofer Myers, Blachly, OR (US)

(72) Inventor: Kristofer Myers, Blachly, OR (US)

( * ) Notice: Subject to any disclaimer, the term of this patent is extended or adjusted under 35 U.S.C. 154(b) by 0 days.

(21) Appl. No.: 13/962,986

(22) Filed: Aug. 9, 2013

(65) Prior Publication Data

US 2014/0059948 A1    Mar. 6, 2014

Related U.S. Application Data

(60) Provisional application No. 61/695,738, filed on Aug. 31, 2012.

(51) Int. Cl.
*A01K 3/00* (2006.01)
*A01M 29/30* (2011.01)
*E04B 1/72* (2006.01)
*A01M 29/32* (2011.01)

(52) U.S. Cl.
CPC .................. *A01M 29/30* (2013.01); *E04B 1/72* (2013.01); *A01M 29/32* (2013.01)
USPC ............................................ 52/101; 119/712

(58) Field of Classification Search
USPC .............................. 52/101; 119/221, 238, 712
See application file for complete search history.

(56) References Cited

U.S. PATENT DOCUMENTS

| 748,201 | A | * | 12/1903 | Miller | 43/65 |
| 3,517,912 | A | * | 6/1970 | Foley | 256/1 |
| 4,307,476 | A | * | 12/1981 | Halstad | 4/256.1 |
| 5,090,152 | A | * | 2/1992 | Ling | 43/64 |
| 5,921,704 | A | * | 7/1999 | Pacholok et al. | 404/6 |
| 6,264,522 | B1 | * | 7/2001 | Dickson | 446/120 |
| 6,447,206 | B1 | * | 9/2002 | Fleury | 405/125 |
| 6,640,506 | B2 | * | 11/2003 | Landers | 52/101 |
| 6,837,000 | B2 | * | 1/2005 | Renzi | 43/124 |
| 7,213,490 | B2 | * | 5/2007 | Weaver et al. | 81/53.1 |
| 2004/0216393 | A1 | * | 11/2004 | Hall et al. | 52/79.1 |
| 2013/0220695 | A1 | * | 8/2013 | Hiller et al. | 174/5 R |

* cited by examiner

*Primary Examiner* — William Gilbert
*Assistant Examiner* — Gisele Ford
(74) *Attorney, Agent, or Firm* — Hancock Hughey LLP

(57) ABSTRACT

A barrier for blocking access to an enclosed space so that wildlife cannot enter the space for either nesting or other habitation is disclosed. Plural resilient spikes extend outwardly in an array from a base. When the apparatus is inserted into a space, the spikes bend so that the tips engage the walls of the space to lodge the barrier in place and resist extraction. The spikes discourage wildlife from entering and nesting in the space.

14 Claims, 7 Drawing Sheets

WILDLIFE BARRIER APPARATUS AND SYSTEM

TECHNICAL FIELD

The present invention relates to apparatus and methods to prevent or discourage wildlife from nesting or otherwise entering enclosed spaces where their presence is undesired. The invention is especially well-suited for use in and around power substations and on buildings.

BACKGROUND

Wildlife such as birds, squirrels and a variety of other animals are well-known to prefer to construct nests and homes in confined spaces. For a variety of reasons such as security and safety for the wildlife, nests are often preferably located in enclosed or partially bounded spaces. All too often, these confined spaces are in man-made places where the presence of wildlife is undesirable and in many situations dangerous. For example, wildlife that nest in or congregate around substations and similar electrical equipment and transmission/distribution facilities often cause power outages and "blinks" when an animal comes into contact with energized electrical equipment. Power companies must deal with blinks and other similar outages on a regular basis and the repair costs—both to power companies and consumers—can be substantial. As another example, wildlife can build nests in drain and gutter systems in buildings, disrupting water runoff and often causing water backup and flooding, with associated damage and costs of repair.

Given the scope of the problems caused by wildlife nesting, it is not surprising that there are many wildlife guards available on the market. The electric utility industry uses a variety of guards such as spiral-type guards that slide over equipment and parts of substations, held in place with clips or ties. These guards are effective to a degree, but they are relatively difficult to install and do nothing to prevent wildlife from nesting in their preferred, bounded spaces.

Despite the many wildlife guards on the market there is a need for a wildlife barrier system that is simple to install and defines an effective way to prevent animals from nesting in places where the animals are not wanted.

The subject invention is an apparatus for blocking or occluding access to an enclosed space so that wildlife cannot enter the space for either nesting or other habitation.

In one embodiment the apparatus is preferably defined by a base member that has plural protruding resilient mechanical members—spikes—that facilitate insertion of the device into a bounded space and which resist subsequent extraction forces. When the apparatus is inserted into a space, the spikes discourage and/or blocks wildlife from entering the space, yet the spikes do not injure or otherwise harm the wildlife.

In an illustrated embodiment, the barrier apparatus is fabricated from molded plastic materials that are assembled into a finished unit. A main body or base is fabricated in the shape of a sphere that is defined by two separate hemispheres, each of which has plural through-opening for plural spikes. The resilient spikes are formed by a group of spikes extending from a cylindrical base structure—two groups of such structures are nested together and held in each hemisphere. The two hemispheres are interconnected to complete the assembly of the barrier apparatus.

According to one aspect of the invention the wildlife barrier apparatus is adapted for installation in and around electrical transmission facilities such as electrical substations. The apparatus includes a loop that may be attached to the hook of a conventional lineman's hot stick; the hot stick is used to grasp the apparatus and the wildlife barrier may be installed in the desired location with the hotstick. Once installed in a bounded space, the hook of the hotstick is disengaged from the loop of the wildlife barrier, leaving the barrier engaged in the space.

In yet another aspect of the invention, the wildlife barrier may be installed by hand—the barrier is inserted into a bounded space in a desired position. Hand installation is appropriate when the barrier apparatus is installed in bounded spaces that are relatively easily reached and in which there is no danger to a worker from live electrical wires and the like.

Regardless of how and where the wildlife barrier apparatus is installed, the barrier blocks entry of wildlife into the bounded space in which the apparatus is inserted. The plural spikes define a deterrent to wildlife from entering the space—the spikes form a physical block to animals attempting to enter the space and because the spikes are pointed, the animals will not try to force passage past the barrier. The spikes are resilient and lodge against the walls of the bounded space, thereby preventing removal of the barrier both by wildlife and otherwise.

The barrier does not injure wildlife but does provide an effective barrier to prevent animals from entering and nesting in locations where they should not be.

BRIEF DESCRIPTION OF THE DRAWINGS

The invention will be better understood and its numerous objects and advantages will be apparent by reference to the following detailed description of the invention when taken in conjunction with the following drawings in which.

DETAILED DESCRIPTION OF ILLUSTRATED EMBODIMENTS

With reference to FIGS. 1 through 7, there are hundreds of locations in and around electrical substations and transmission facilities where wildlife such as birds and squirrels and the like find suitable nesting and habitat. While these enclosed or semi-enclosed locations are apparently ideal habitat for wildlife, they are problematic for the power company (and the animals) since the animals often are electrocuted, which causes power interruption, spikes and outages.

Figure 6:
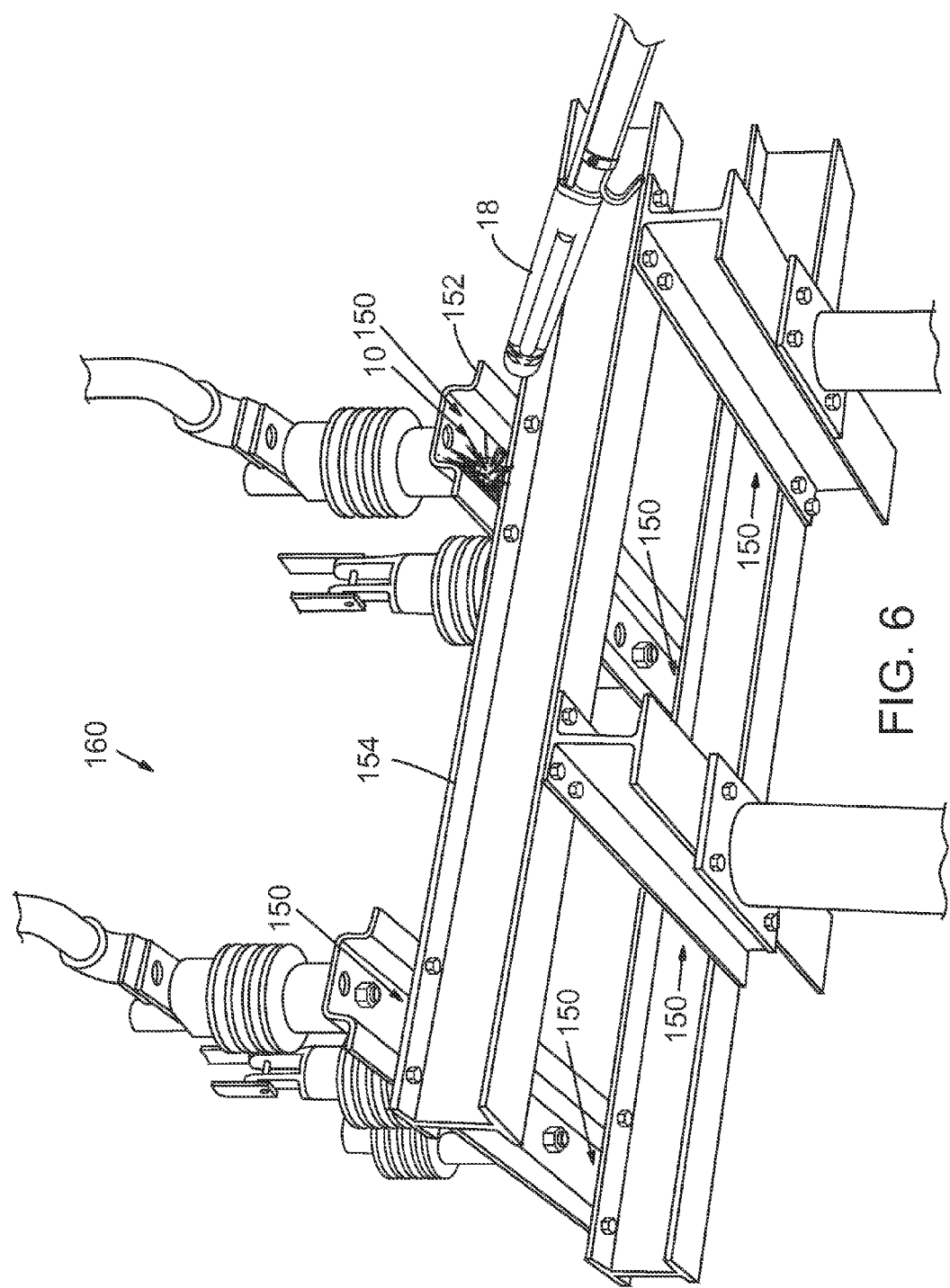
FIG. 6 is a perspective view of equipment typically found in an electrical substation, and illustrating plural wildlife barrier apparatuses according to the present invention installed in bounded spaces in the electrical equipment, illustrating the hotstick being withdrawn after the wildlife barrier has been inserted into a bounded space.
Figure 7:
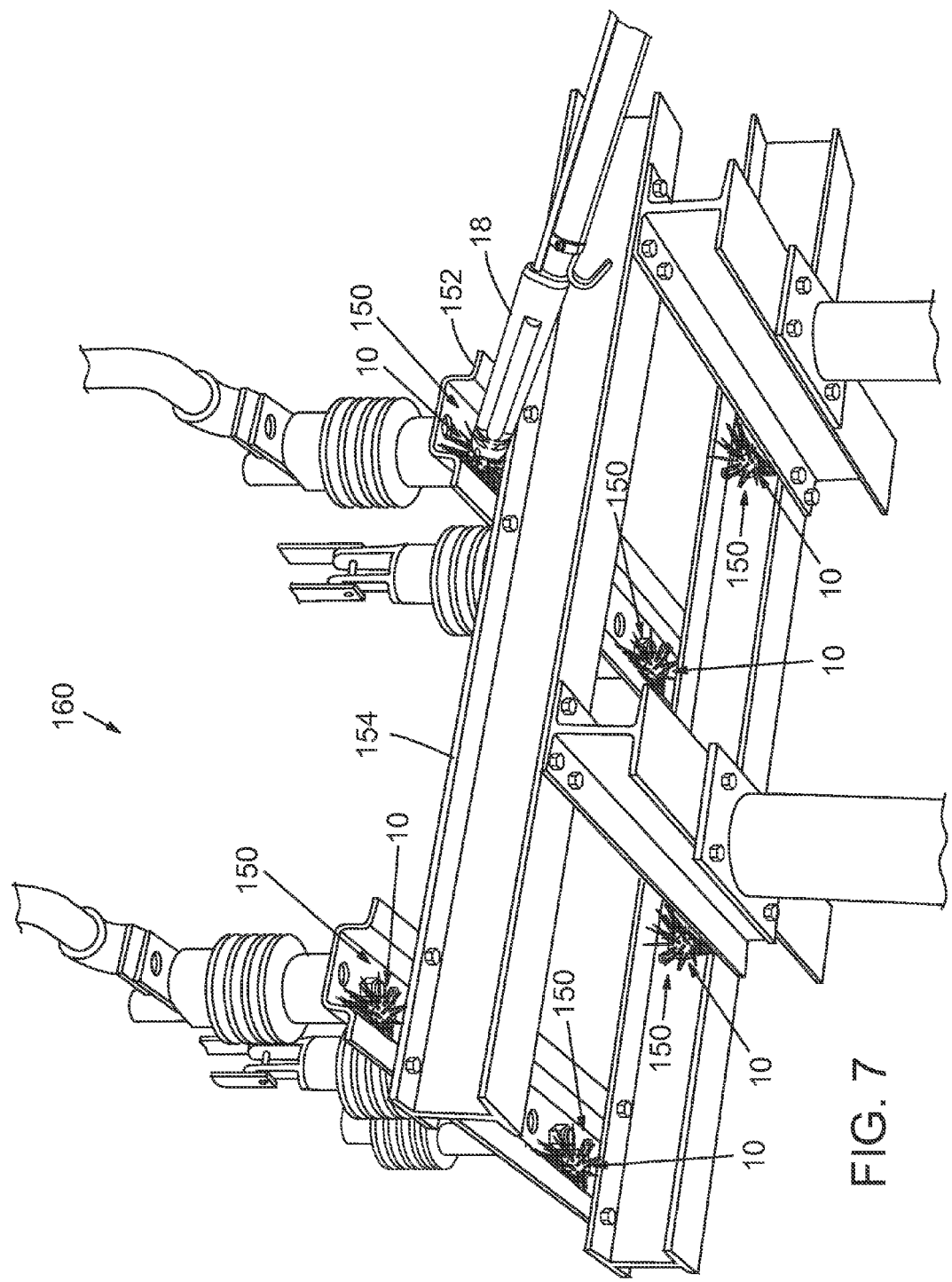
FIG. 7 is a perspective view similar to that shown in FIG. 6, and illustrating one barrier apparatus being installed in a bounded space with a hotstick.

Just a few of these nesting locations are illustrated in FIGS. 6 through 7. Thus, in any electrical facility such as a substation, power pole, etc. there are spaces between adjacent structures that are very inviting to birds, squirrels and other animals to enter and build nests. In FIGS. 6 and 7 these spaces are well shown as being between adjacent support beams and the like. It will be appreciated that there are many hundreds of analogous spaces where animals can enter. These spaces are at times referred to herein as "bounded spaces." As used herein, the term bounded space refers to any location where the wildlife barrier of the invention may be installed. Typical such bounded spaces are illustrated in FIGS. 6 and 7 as being openings between adjacent structures or surfaces that have or define opposed top and bottom, or side walls. But there are many similar types of bounded spaces. For example, the barrier apparatus may be installed in a tubular or cylindrical opening such as a downspout or other pipe—in the case of a downspout, the barrier does not prevent water from flowing out of the downspout but prevents animals from entering the pipe and the interior wall of the cylindrical pipe defines, for purposes herein, a surface that the resilient members of the wildlife barrier are able to engage to lodge the device in the tube. Because as detailed below the resilient members are flexible and easily deform, the apparatus may also be installed between surfaces or structures that are spaced from one another yet allow the resilient members to attach to the surfaces or structures and thereby lodge the apparatus between therebetween. As an example, the apparatus may be adequately lodged between two planar members oriented at right angles to one another, or even oriented at obtuse angles, provided the surfaces of the members have some type of lip or other structure that allows the resilient members to find a purchase on the surface.

Turning now to the drawings, a first illustrated embodiment of the wildlife barrier 10 according to the present invention is shown. Barrier 10 comprises a main body 12 (also called base member 12) that has plural protruding resilient mechanical members or spikes 14 extending from the main body 12, and optionally, a loop 16, which as detailed below, may be used in some instances to assist with installation of the barrier 10. Main body 10 is shown as a sphere in FIGS. 9 through 16 but the base may be any shape.

The main body may be fabricated of many types of material and is adapted to receive the plural resilient members 14 around the main body so that the resilient members extend outwardly from the main body. As an example, the main body 12 could be fabricated from many types of plastics or rubber compounds, could be solid or hollow, and could be pliant or rigid. The resilient members 14 likewise may be fabricated from materials such as plastics and retained in the main body 12 in any appropriate manner such as welding or with adhesives. It is preferable that the main body 12 and the resilient members 14 be fabricated from non-conductive materials, and of course, when an apparatus 10 is used near electrical equipment non-conductive materials are very important. However, since the invention is not limited to use around electrical equipment it is not always necessary to use non-conductors.

Barrier 10 may be of any particular size, both in terms of the main body 12 and the size and length of the protruding resilient members 14. For example, the barrier 10 shown in the figures is generally spherical, both in terms of the geometric shape of the main body 12 and the general geometry defined by the plural spikes 14. However, the main body may be any geometric shape and there is no reason why the spikes need to conform to any geometry or length. Instead, the size, configuration and shape of the barrier 10 are dictated by the size and geometry of the bounded space into which the apparatus will be installed. And the apparatus 10 may be fabricated in many different sizes to accommodate installation in bounded spaces of different sizes. A larger sized barrier 10 is useful for installation into a larger opening, that is, a larger bounded space. A relatively smaller sized barrier 10 is used in smaller openings. It will be appreciated that the resilient members 14 may be of a variety of lengths and dimensions, and the size dimensions of the resilient members may be controlled to control the relative flexibility and strength of the members. Moreover, an apparatus 10 may include resilient members of varying length.

As may be seen in the embodiment illustrated herein, wildlife barrier apparatus 10 comprises a spherical main body 12 that is fabricated from 2 hemispherical halves that are joined to one another and which include plural openings through which resilient members 14 extend outwardly of the base 12. As detailed below, this particular construction facilitates relatively easy manufacturing and shipping of units in a disassembled condition. However, it will be understood that the apparatus 10 may be fabricated in any number of manners and that the particular embodiment described herein is exemplary in order to illustrate an embodiment of the invention and is not meant in any way to limit the scope of the invention.

Spherical base member 12 comprises two hemispheres, namely, first hemisphere 50 and second hemisphere 52, which are interconnected and joined along an equatorial junction 54 to define the spherical base member 12. The base member 12 contains plural openings 56 through which resilient members 14 extend from the interior of the base member to the exterior.

Figure 4:
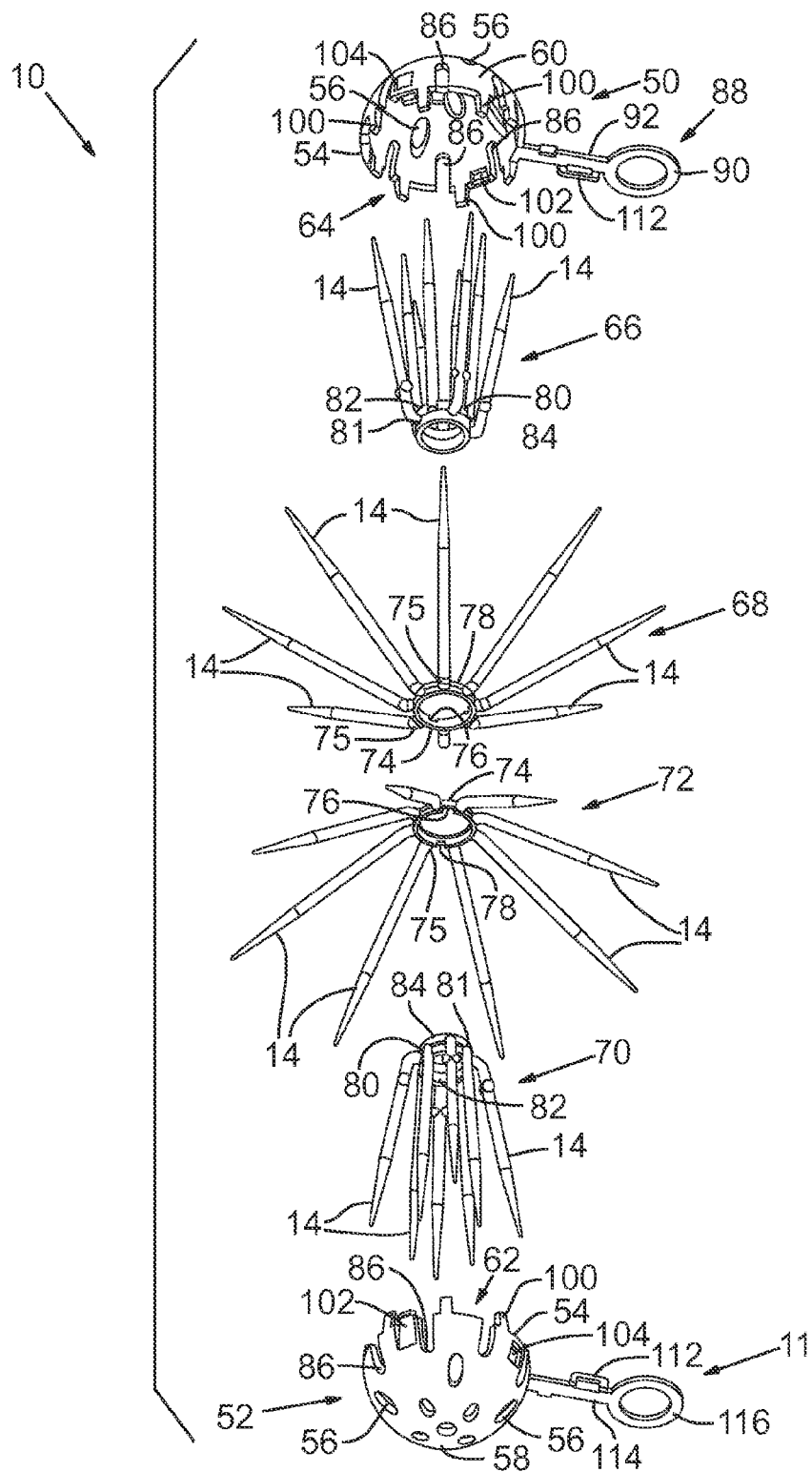
FIG. 4 is an exploded view of the wildlife barrier illustrated in FIG. 3, illustrating the component parts according to one manner of constructing the apparatus.

As best illustrated in FIG. 4, the first and second hemispheres 50 and 52 are defined by walls 58 and 60, respectively, through which openings 56 are formed and which leave open interior spaces 62 and 64, respectively. Each of the first and second hemispheres defines an open area for receiving and retaining the resilient members 14. In FIG. 4 there are two groups of resilient members 14 that are, in the assembled apparatus 10, contained and retained in each hemisphere. More specifically, a first group 66 of resilient members 14 and a second group 68 of resilient members 14 are retained in first hemisphere 50, and likewise a first group 70 of resilient members 14 and a second group 72 of resilient members 14 are retained in second hemisphere 52. Each of the groups of resilient members 14, namely, groups 66, 68, 70 and 72 is formed by a cylindrical base from which the spikes 14 extend. Groups 66 and 70 are identical, and groups 68 and 72 are identical.

With respect to groups 68 and 72, eight resilient members 14 are radially spaced around, attached integrally to and extend from the cylindrical base 74. The resilient members are evenly radially spaced around the cylindrical base 74. Preferably, the groups 68 and 72 are formed in a unitary piece, for example, by injection molding. The attachment between each of the resilient members 14 and the cylindrical base 74 at the base 75 of the resilient members 14 allows the resilient members to be movable relative to the base—there is essentially a living hinge formed at the base 75 where the spikes 14 attach to the base 74. The cylindrical base 74 includes first and second notches 76, 78, at opposite sides of the base. The purpose of the notches 76 and 78 is detailed below. The cylindrical base 74 defines a plane and the resilient members extend from the base at an angle relative to the plane of the base.

As noted, groups 66 and 70 are also identical. Each of these groups is defined by eight resilient spikes 14 that are radially spaced around, attached integrally to and extend from a cylindrical base 80. The resilient members 14 are evenly radially spaced around the cylindrical base 80. Again, preferably, the groups 66 and 70 are formed in a unitary piece, for example, by injection molding so that the attachment between the base 81 of each of the resilient members 14 and the cylindrical base 80 defines a living hinge that allows the resilient members to be movable relative to the base. The cylindrical base 80 is defined by an upper portion 82 to which the resilient members 14 are attached, and a lower portion 84 that has an outer diameter that is less than the outer diameter of the upper portion 82. The outer diameter of the lower portion 84 is the same as or slightly less than the inner diameter of cylindrical base 74 so, as detailed below, when group 66 is mated with group 68 the two groups nest together; when group 70 is mated with group 72 the two groups nest together. The cylindrical base 80 defines a plane and the resilient members 14 extend from the base 80 at an angle relative to the plane of the base—as may be seen in FIG. 4, the angle at which the resilient members 14 extend from base 80 is greater than the angle at which the resilient members 14 extend from base 74.

Each of the resilient members 14 thus has a distal end that is pointed and a proximal end that is joined to a cylindrical member or some other base. The resilient members are flexible and bendable, both individually and as a group, which as detailed below facilitates insertion of the apparatus 10 into a bounded space but once inserted, causes resistance to removal of the apparatus.

Each of the first and second hemispheres 50 and 52 is fabricated in a unitary piece (for example, by injection molding) and is designed so that the hemispheres attach to one another along the equatorial junction 54. With continuing reference to FIG. 4, first hemisphere 50 includes eight openings 56 through which the eight resilient members 14 of the first group 66 of resilient members extend in the assembled apparatus 10. First hemisphere 50 further includes eight notches 86 that are evenly spaced around the equatorial junction 54 and which are positioned for receiving the eight resilient members 14 of the second group 68 of resilient members in the assembled apparatus 10. Adjacent the notches 86 are oppositely extending tabs 100, which as detailed below, interact with notches 86 of the opposite hemisphere 52 when the two are assembled. Connecting tabs 102 are also formed at intervals around the equatorial junction 54, and connecting tab receiving ledges 104 are similarly formed. When the two hemispheres are aligned in respect of one another and assembled, the connecting tabs 102 of one hemisphere attach to the connecting tab receiving ledges of the other hemisphere. The loop 16 is formed in two halves, one half formed as part of each of the two hemispheres. Half 88 is attached to first hemisphere 50 and is defined by an open loop 90 that is on the end of an outwardly extending base 92.

Figure 3:
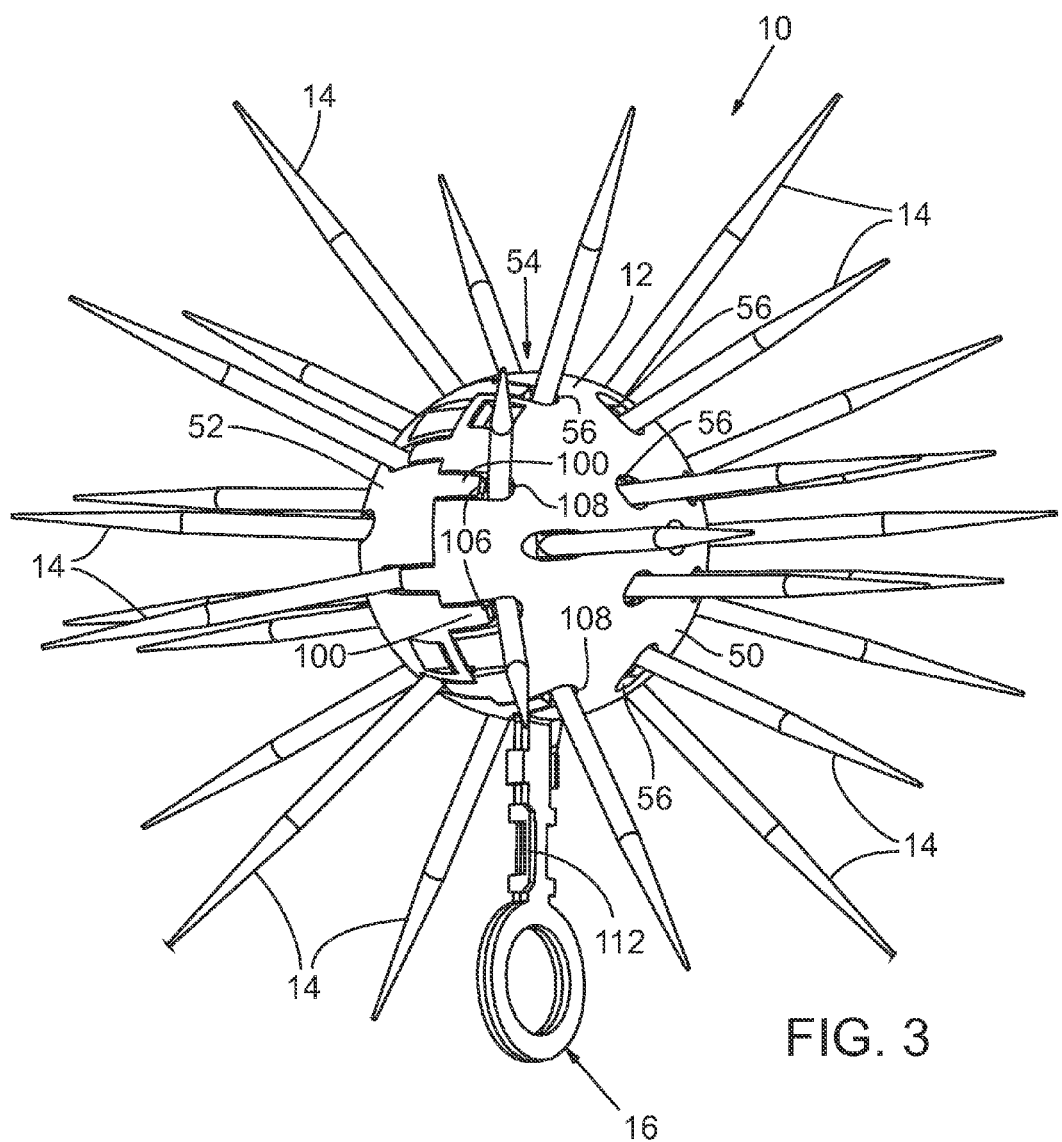
FIG. 3 is a side elevation view of the wildlife barrier according to the present invention and as shown in FIG. 1, illustrating the apparatus in isolation.

The opposite, second hemisphere 52 is designed to mate with the first hemisphere 50. Specifically, when second hemisphere 52 is attached to first hemisphere 50 along equatorial junction 54, the tabs 100 of one of the hemispheres are received into the notches 86 of the opposite hemisphere and the connecting tabs 102 of the first hemisphere 50 attach to the connecting tab receiving ledges 104 of the opposite hemisphere to secure the two hemispheres together (as shown in FIG. 3). It will be noted that when the two hemispheres are attached to one another, the outermost ends 106 of tabs 100 are spaced apart from the innermost base portion 108 of notches 86 to define a plural openings 56 through which the resilient members 14 of groups 68 and 72 extend.

Loop 16 half 110 is attached to second hemisphere 52 and is defined by an open loop 112 that is on the end of an outwardly extending base 114.

When the two hemispheres 50 and 52 are assembled as shown in FIG. 3, the loop 16 is formed by halves 88 and 110 aligning and mating together, and attached to one another with mating tabs 112. The assembled apparatus 10 defines an array of resilient members 14 joined at a common point (i.e., base member 12 or an analogous point) and extending therefrom.

Figure 5:
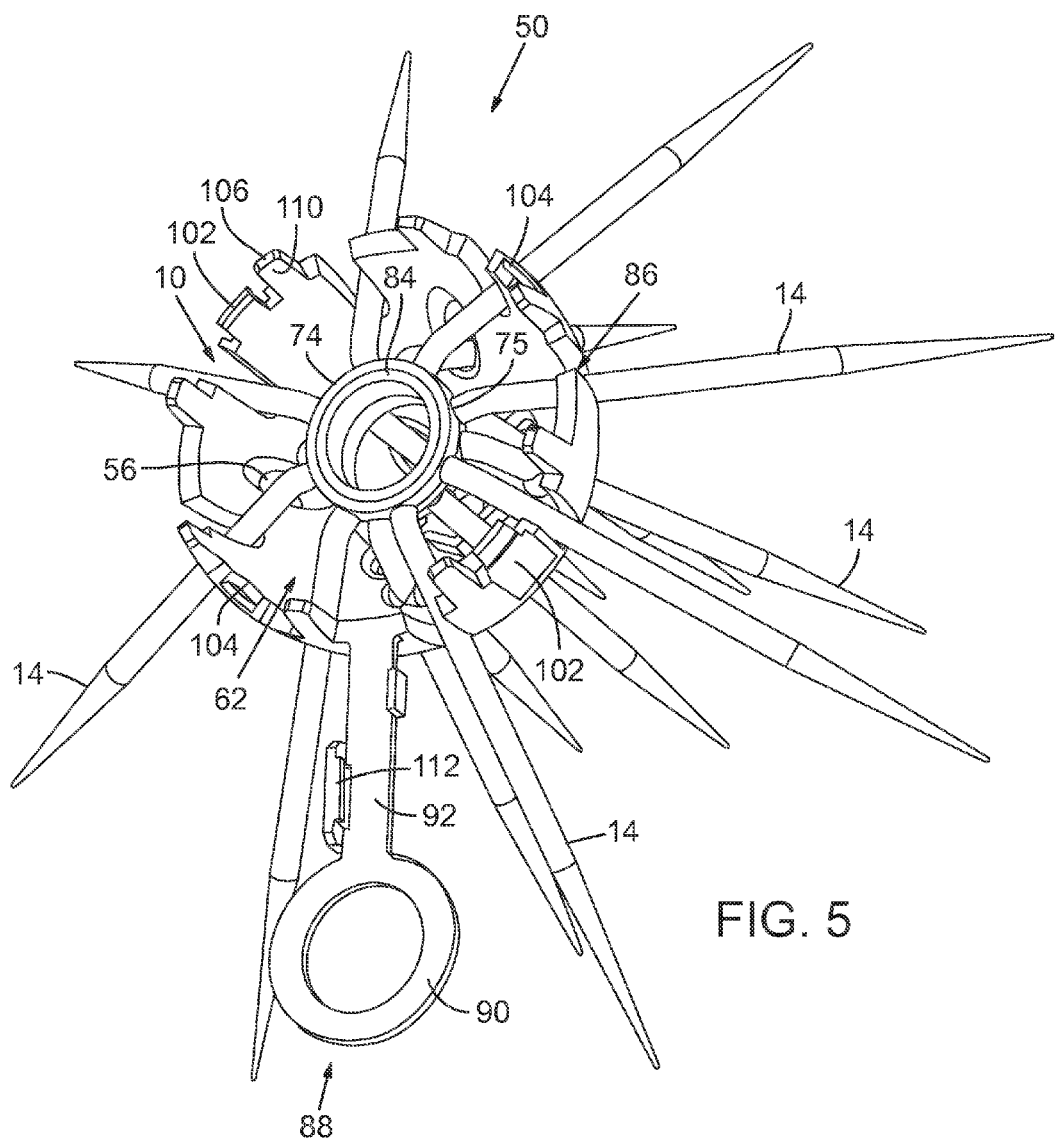
FIG. 5 is a perspective view of one hemisphere of the wildlife apparatus shown in FIG. 4, showing the component parts assembled with the hemispheric base.

FIG. 5 illustrates one of the hemispheres that comprise base 12, specifically, hemisphere 50, with first and second groups 66 and 68 assembled with the hemisphere. From review of FIG. 5 it is evident that the eight spikes 14 of first group 66 are first inserted through the eight openings 56 in hemisphere 50, such that the spikes extend through the openings. Next, the eight resilient members 14 of second group 68 are aligned with the eight notches 86 that are spaced radially around equatorial junction 54. With the spikes 14 thus aligned with notches 86, the second group 68 is pushed toward the first group 66 and the two groups are interconnected when the lower cylindrical portion 84 of cylindrical base 80 of first group 66 is inserted into the cylindrical base 74 of second group 68. When the first group 66 is thus nested with the second group 68, the base 81 of two opposed resilient members 14 of the second group 68 are received in the notches 74 and 78 of the cylindrical base 74 of the first group 66, thus providing a secondary interconnection between the two groups.

The opposite hemisphere 52 is assembled with first and second groups of resilient members 14 in the same manner, and the two thus-assembled hemispheres are attached to one another along the equatorial junction 54. This is done by aligning the two hemispheres so that tabs 100 of one hemisphere align with notches 86 of the opposite hemisphere, with halves 88 and 110 that define loop 16 aligned, and with the connecting tabs 102 aligned with the connecting tab receiving ledges 104. When the two hemispheres are joined together, the connecting tabs 102 snap onto the connecting tab receiving ledges 104 to secure the two hemispheres together as shown in FIG. 3.

It will be appreciated that the description of wildlife barrier apparatus 10 detailed above is just one exemplary way in which the apparatus may be manufactured. There are innumerable other methods to make the device, including forming the base 12 and spikes 14 in a single, unitary piece. Likewise, the spikes 14 may be inserted into a premade base and secured therein. The illustrated embodiment is beneficial since the components may be nested together prior to assembly, thereby reducing the space required for transport and storage (e.g., multiple groups of spikes such as first groups 66 may be nested in one another).

Generally speaking, to install the wildlife barrier apparatus 10 an appropriately sized unit for a given bounded space is selected. The main body 12 is smaller than the opening into the bounded space into which the apparatus 10 is to be inserted, and the overall width of the apparatus 10 (i.e., the width of the apparatus measure between outermost tips of opposed resilient members 14) is greater than the dimensions of the bounded space. The apparatus 10 is then forcibly inserted into the bounded space. As the apparatus is pushed into the space, the resilient members 14 that make contact with a surface of the bounded space bend and are deflected by the walls—the adjacent surfaces—of the bounded space and, because the members are resilient, they tend to bend relatively easily. If the configuration of the resilient members 14 shown in FIG. 3 is defined as the normal or resting configuration, then when the apparatus 10 is inserted into a bounded space the resilient members 14 that contact a surface reconfigure by bending upon insertion to a second position that facilitates insertion. Once the main body 12 is sufficiently inserted into the bounded space, the resilient members 14 exert pressure against the walls of the bounded space—the resilient members naturally seek their normal or resting positions. As such, these mechanical forces applied to the walls of the bounded space by the resilient members resist or prevent removal of the apparatus 10. Moreover, the outer tips of the resilient members tend to catch uneven surface irregularities and the like in the bounded space to further prevent extracting forces and removal of the apparatus. In other words, the tips or distal ends of the resilient members tend to engage the surface of the space into which the apparatus 10 is installed and thereby prevent unintended removal of the apparatus.

Figure 1:
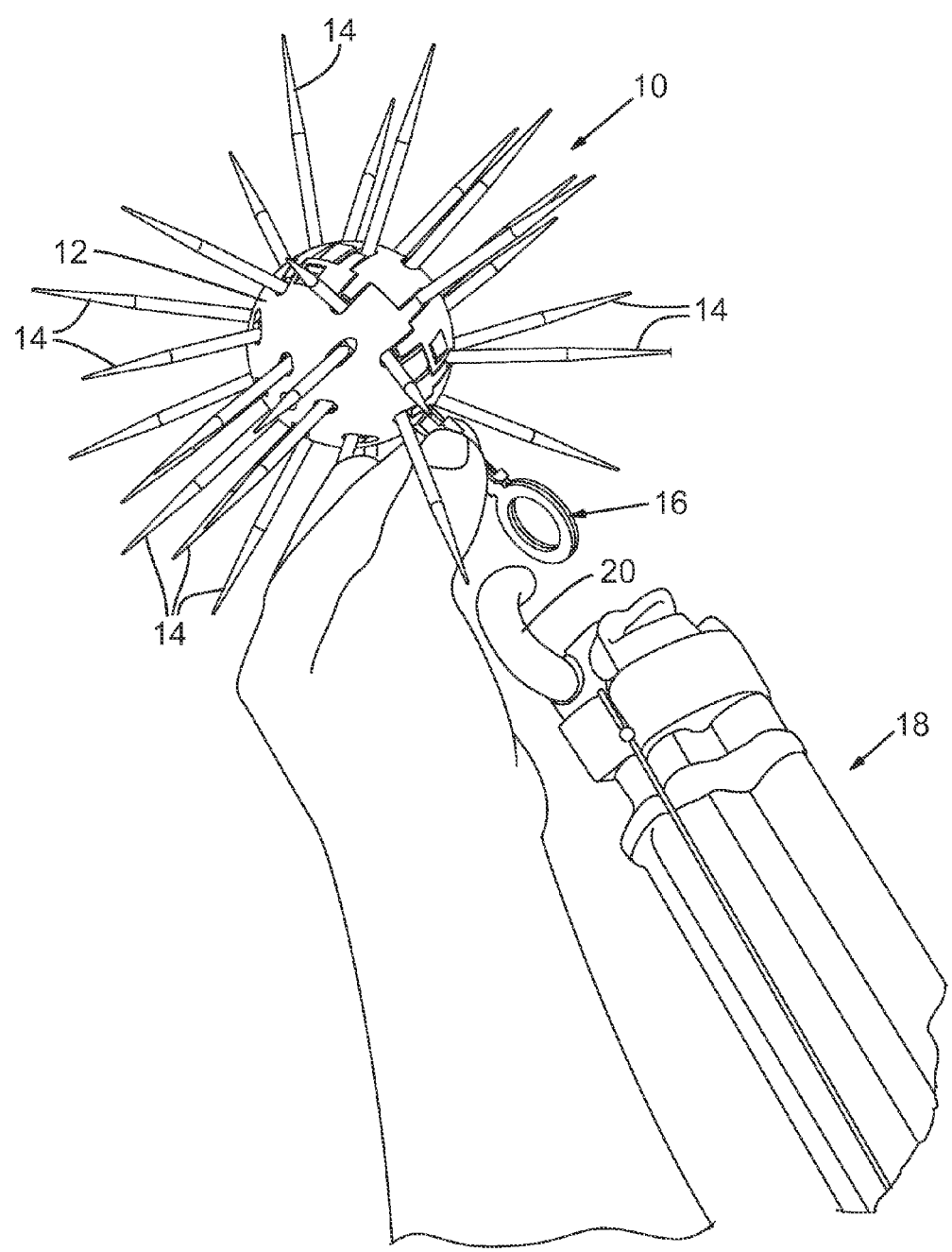
FIG. 1 is perspective view of a first illustrated embodiment of a wildlife barrier apparatus according to the present invention, showing the apparatus being held by a worker prior to being engaged by a conventional lineman's hot stick.
Figure 2:
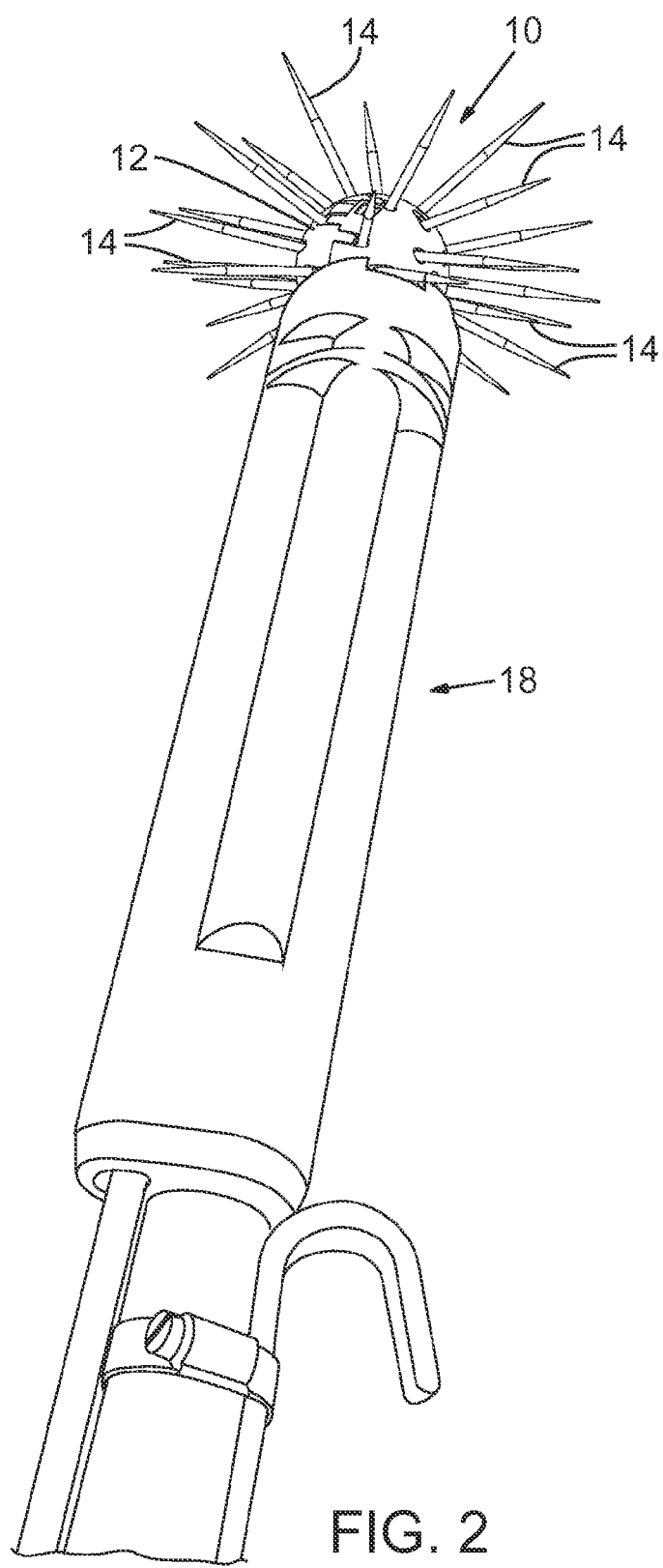
FIG. 2 is a perspective view of the wildlife barrier shown in FIG. 1 attached to the distal end of the hotstick.

Apparatus 10 may be installed by hand or, in the case of the apparatus being used in an energized electrical system, with the loop 16 that serves as a connection between the apparatus 10 and an insulated hot stick 18, as referenced above. The hot stick 18 is a standard insulated tool used by electricians to work around energized electrical systems. The distal end of the hot stick 18 has a hook 20 that may be remotely manipulated by the lineman/electrician. As shown in FIG. 2, the hook 20 is in the open position. A lineman inserts the hook 20 through a loop 16 of apparatus 10 so that the hook 20 engages the loop 16 and the hot stick 18 is then manipulate to draw the apparatus 10 inwardly toward the hot stick to stabilize it for insertion into a bounded space (e.g., FIG. 2). With the apparatus 10 thus securely held by the hot stick 18, the apparatus may be inserted into a desired bounded space. The hot stick is then manipulated to release the attachment between hook 20 and loop 16 so that the hot stick is withdrawn and the apparatus 10 remains in place.

The culmination of this sequence is illustrated in FIG. 6, where an apparatus 10 has been inserted into a bounded space 150 that is between beams 152 and 154 of an electrical installation 160, and the hot stick 18 has been disconnected from apparatus 10 and is being withdrawn. In this figure the bounded space into which apparatus 10 is inserted is a space bounded by four walls. But there are numerous other bounded spaces illustrated in FIG. 6 into which apparatuses 10 may be inserted—these are identified as bounded spaces 150. As noted above, a bounded space as that term is used herein is any location where an apparatus 10 may be lodged; there is no reason why the apparatus need be lodged in a space having 4 opposed walls. So long as there are sufficient structures for the apparatus 10 to be retained in place, the structures define a "bounded space."

Finally, in FIG. 7 plural wildlife barrier apparatuses 10 are illustrated lodged in plural bounded spaces 150. In this drawing the hot stick 18 is illustrated in the process of inserting an apparatus 10 into a desired bounded space 150.

It will be appreciated that the apparatus 10 is a self-lodging wildlife barrier that requires no additional means of connection to the structure into which it is inserted other than the apparatus itself. That is, the apparatus is designed to establish a positive engagement with the surfaces of the equipment into which the apparatus is inserted with no additional mechanical connections. This makes remote installation with a hot stick or by hand very simple and quick.

The invention provides numerous advantages and cost savings. In the context of its use in and around electrical substations and facilities, the invention helps to:
prevent power outages
prevent damage to equipment
protect wildlife from electrocution
eliminate insurance claims filed by power companies and their consumers
prevent down time to electrical users due to outages
prevent fires and catastrophic damage caused by wildlife
lessen the costs of maintenance and clean up.

As noted, the invention is also useful around buildings, both commercial and residential. As described above, the apparatus 10 may be inserted into any bounded space to prevent animals from entering the space and habituating in it, without endangering the animals.

Those of skill in the art will recognize that the wildlife barrier apparatus described herein and illustrated in the drawings may be fabricated in many different forms that are equivalent to the invention claimed. As an example, the resilient members may extend from a central junction point where they are connected, in which case the main body or base member 12 is defined by the junction of plural spikes at a central point. As another example, plural resilient members may be joined to one another midway along their length, in which case the proximal end of each resilient member is defined by the point where the member is attached to other adjacent members. Other modifications will be evident from review of the disclosure.

As another example of an alternative embodiment of the wildlife barrier apparatus according to the present invention, a barrier may be defined by a single hemisphere such as either 50 or 52 as described above, with the plural resilient members extending therefrom through plural openings formed in the hemisphere as detailed above, and the equator of the hemisphere modified so that the hemisphere may be placed onto a flat surface (such as, for example, atop an electrical transformer). In this case, the open interior of the hemisphere may be closed off with a planer base member that defines a base on which the hemisphere sits when in place on a surface. The barrier apparatus according to this embodiment may be attached to a flat surface in any variety of manners, including for example with magnets attached to the planar base member (for attaching the barrier to metallic surfaces), or with screws or other fasteners that may be inserted through, for example, tabs formed around the exterior of the hemisphere, extending outwardly in positions to accept the fasteners.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A method of blocking wildlife access to a space, comprising the steps of:
   a) identifying a space near live electrical equipment and bounded by surfaces;
   b) determining a size of the space and a distance between surfaces;
   c) attaching a barrier to a hotstick; and
   d) inserting said barrier into said space, wherein said barrier has plural elongate resilient members defining an array having overall width greater than the distance between surfaces such that at least some of said elongate resilient members bend and engage the surfaces to impede extraction of said barrier from said space.

2. The method of claim 1 including the step of using the hotstick to insert the barrier into the space and disconnecting the hotstick from the barrier.

3. The method of claim 1 wherein the space is a part of a building structure.

4. A wildlife barrier, comprising:
a body;
plural resilient members extending outwardly from said body, each of said resilient members having a distal end and at least some of said resilient members bending upon insertion of said body into a bounded space defined by an opening between plural adjacent surfaces when said at least some of said resilient members contact said plural adjacent surfaces, into a position that facilitates insertion of said body into said bounded space while impeding or resisting extraction forces; and
wherein said body is defined by a hollow member having plural openings, and wherein said plural resilient members are defined by elongate spikes, each with a proximate end in the hollow member and a distal end outside of the hollow member and in which the proximate ends of each said plural spikes are flexibly attached to a common cylindrical base and said plural spikes are spaced around said common cylindrical base, and wherein at least some of said resilient members that bend upon insertion into said bounded space engage said plural said plural adjacent surfaces to impede extraction of said barrier from said bounded space.

5. The wildlife barrier according to claim 4 wherein said plural adjacent surfaces are defined by the interior surface of a tube.

6. The wildlife barrier according to claim 5 wherein said distal ends engage said plural adjacent surfaces to thereby impede or resist extraction forces.

7. The wildlife barrier according to claim 4 including plural cylindrical bases in the hollow member, wherein each of said plural cylindrical bases has plural spikes flexibly attached thereto and radially spaced there around, and wherein each spike extends through an opening in the hollow member.

8. The wildlife barrier according to claim 7 wherein the hollow member is spherical and is defined by two hemispheres joined at an equator.

9. The wildlife barrier according to claim 8 wherein some of the openings in the hollow member are located along the equator.

10. The wildlife barrier according to claim 4 including a loop attached to the body.

11. A wildlife barrier, comprising:
plural elongate and bendable spikes, each of said spikes having a distal end and a proximal end, wherein the proximal ends of said spikes are joined with a living hinge to a cylindrical member within a hollow base member so that said spikes define an outwardly extending array and wherein when said barrier is inserted into an opening between at least 2 adjacent walls the distal ends of at least some of said plural spikes engage said adjacent walls to thereby cause said spikes to bend and so that the distal ends of said at least some of said plural spikes engage said adjacent walls.

12. The wildlife barrier according to claim 11 wherein said spikes are in a resting first position and when said array is inserted into said opening said at least some of said plural spikes bend into a second position in which the distal ends of at least some of said plural spikes engage said walls so that said array is lodged in said space.

13. The wildlife barrier according to claim 12 wherein in the second position the array resists extracting forces.

14. The wildlife barrier according to claim 13 wherein the array includes means for releasably attaching said array to a hotstick.

* * * * *